United States Patent [19]

Suzuki et al.

[11] Patent Number: 4,980,108
[45] Date of Patent: Dec. 25, 1990

[54] PROCESS FOR FORMING A POLYURETHANE COATED BIAXIALLY ORIENTED POLYESTER FILM

[75] Inventors: Kenji Suzuki, Yokohama; Sadayoshi Miura, Yamato, both of Japan

[73] Assignee: Teijin Limited, Osaka, Japan

[21] Appl. No.: 315,590

[22] Filed: Feb. 27, 1989

[30] Foreign Application Priority Data

Feb. 29, 1988 [JP] Japan .................. 63-44107

[51] Int. Cl.$^5$ ................ B29C 55/12; B29D 9/00; B32B 27/08
[52] U.S. Cl. ................ 264/134; 264/288.4; 264/290.2; 427/172
[58] Field of Search .......... 264/132, 134, 288.4, 264/290.2; 427/172, 173

[56] References Cited

U.S. PATENT DOCUMENTS

| | | | |
|---|---|---|---|
| 930,401 | 8/1909 | Monteagle | 210/345 |
| 1,001,929 | 8/1911 | Collins | 210/90 |
| 2,064,511 | 12/1936 | Wells | 210/165 |
| 2,539,450 | 1/1951 | Magill | 210/497.01 |
| 3,061,107 | 10/1962 | Taylor | 210/487 |
| 3,241,680 | 3/1966 | Humbert | 210/457 |
| 3,397,793 | 8/1968 | MacDonnell | 210/457 |
| 3,442,392 | 5/1969 | Skelley | 210/491 |
| 3,578,175 | 5/1971 | Manjikian | 210/497.1 |
| 3,769,128 | 10/1973 | Manjikian | 156/185 |
| 3,904,798 | 9/1975 | Yogt et al. | 428/36 |
| 4,065,341 | 12/1977 | Cub | 55/498 |
| 4,101,423 | 7/1978 | Merrill et al. | 210/497.1 |
| 4,364,885 | 12/1982 | Kanai et al. | 264/134 |
| 4,402,830 | 9/1983 | Pall | 210/497.1 |
| 4,594,202 | 6/1986 | Pall et al. | 264/8 |
| 4,692,196 | 9/1987 | Ellegood et al. | 156/187 |
| 4,726,901 | 2/1988 | Pall et al. | 210/496 |
| 4,755,337 | 7/1988 | Takahashi et al. | 264/134 |

FOREIGN PATENT DOCUMENTS

| | | | |
|---|---|---|---|
| 547695 | 11/1959 | Belgium | 210/497.2 |
| 724242 | 9/1942 | Fed. Rep. of Germany | 210/497.2 |
| 3515062 | 10/1986 | Fed. Rep. of Germany | 210/497.1 |
| 53-2390 | 1/1978 | Japan | 210/497.1 |
| 55-39279 | 9/1980 | Japan . | |
| 173252 | 7/1987 | Japan | 264/134 |
| 263237 | 11/1987 | Japan | 264/134 |

Primary Examiner—James Lowe
Attorney, Agent, or Firm—Sherman and Shalloway

[57] ABSTRACT

A process for producing a polyester film having a thin cured polyurethane coating, which comprises (1) applying an aqueous composition comprising a thermosetting polyurethane prepolymer as a film-forming component to at least one surface of an unoriented aromatic polyester film to form a thin wet coating on it, said polyurethane prepolymer being characterized by (i) having a polyol component at least 10% by weight of which is composed of a polyol containing a carbon-carbon double bond selected from unsaturated polyester polyols and polybutadiene polyols, the carbon-carbon double bond being cleavable under ultraviolet light, (ii) having a pendant anionic hydrophilic group in the polymer chain, and (iii) having isocyanate groups blocked with an oxime at the ends of the polymer chain, and (2) thereafter stretching and heat-setting the coated film, during which time the wet coating of the aqueous composition is dried and the polyurethane prepolymer is cured to form a thin cured polyurethane coating having a carbon-carbon double bond on the biaxially oriented polyester film.

17 Claims, No Drawings

PROCESS FOR FORMING A POLYURETHANE COATED BIAXIALLY ORIENTED POLYESTER FILM

BACKGROUND OF THE INVENTION

1. Field of the Invention

This invention relates to a process for producing a polyester film having a thin cured coating of polyurethane, and to the use of the polyester film for the production of a printed film by applying an ultraviolet-curable ink. More specifically, it relates to a process for producing a polyester film which has solvent resistance, antiblocking property and ease of adhesion, particularly excellent adhesion to a radical-polymerized resin and is useful as a substrate for film products, particularly a floppy disc, a magnetic card, a membrane circuit, an adhesive tape, a label, a dry film resist and a masking film, and to the use of the polyester film.

2. Discussion of the Prior Art

It is known to form films by melt-extrusion of thermoplastic polyesters such as polyethylene terephthalate or a copolymer thereof, polyethylene naphthalate or a copolymer thereof, or a blend of such a polymer or copolymer with a minor proportion of another resin. Biaxially stretched and heat-set polyester films finally obtained are known to have better thermal resistance, gas-barrier property, electrical properties and chemical resistance than films of other resins. Since, however, the surface of such polyester films is highly crystallized and oriented, it has high cohesiveness and therefore poor adhesion to paints, adhesives, inks, etc.

Physical treatments (such as corona discharge treatment, ultraviolet light treatment, plasma treatment), electron beam treatment, flame treatment, or chemical treatments (treatments with chemicals such as alkalies, aqueous amine solutions, trichloroacetic acid, and phenols) are known as a method of improving the adhesion. However, these methods are disadvantageous in practical application because they may cause degradation of the adhesion with time or the working environment may be polluted by the volatilization of the chemicals.

Another known means is to form a primer layer on the film surface by coating an easily adhesive coating agent in an ordinary polyester film-producing step, or in another step.

Japanese Laid-Open Patent Publication No. 6767/1982 (U.S. Pat. No. 4,364,885 and British Pat. No. 2,079,182) discloses an easily adhesive polyester film comprising a polyester film and coated on its surface, a composition comprising a montan wax salt and an aqueous dispersion of polyurethane.

Japanese Laid-Open Patent Publication No. 90022/1982 discloses a method which comprises coating the surface of a plastic film with a composition composed of a polyol compound having an ethylenically unsaturated bond and a polyisocyanate compound in an NCO/OH mole ratio of at least 0.8 and curing the composition to form a layer of polyurethane resin having an ethylenically unsaturated bond. This patent document describes diols having a relatively low molecular weight obtained by reacting a low-molecular-weight diepoxide with 2 equivalents of acrylic or methacrylic acid and hydroxylterminated polybutadiene compounds as the polyol compound having ethylenically unsaturated bonds. By this method, the diol and the polyisocyanate are slowly reacted on the film surface, as can be seen from the statement that the above-mentioned curing reaction is carried out at 10 to 60° C. for 2 to 3 days.

Japanese Laid-Open Patent Publication No. 78761/1983 discloses an easily adhesive polyester film obtained by coating at least one surface of a polyester film with a water-soluble or water-dispersible polyester resin having a sulfonic acid group and a water-soluble or water-dispersible polyurethane resin having an anionic group. This patent document is quite silent on a polyurethane resin having an ethylenically unsaturated bond.

Japanese Laid-Open Patent Publication No. 145232/1986 discloses a method of producing an easily adhesive polyester film which comprises coating at least one surface of a polyester film with an aqueous solution of a hydrophilic self-crosslinkable polyurethane composition having blocked isocyanate groups in the molecule, and then heating the coating to cure the composition. This patent document only describes a method of imparting hydrophilicity by blocking the isocyanate groups at the chain ends of the polymer with a bisulfite and sodium sulfite. It does not disclose polyurethane containing hydrophilic groups pendant to the polymer chain. When heated for curing of polyurethane, the isocyanate groups blocked with the bisulfite or sodium sulfite liberate the bisulfite or sodium sulfite. These compounds have the defect of corroding a metal surface and rendering the coated film surface non-uniform Japanese Laid-Open Patent Publication No. 59635/1987 discloses a method of producing a polyester film for use in magnetic cards, which comprises coating a polyurethane resin having an anionic group in an aqueous medium on at least one surface of a polyester film containing a white pigment, and stretching the coated film. This patent document is quite silent on a polyurethane resin containing a pendant anionic hydrophilic group in the polymer chain and having a carbon-carbon double bond. Japanese Laid-Open Patent Publication No.

59636/1987 discloses a method of producing a polyester film for wiring base boards which is substantially the same as the method of the above-cited Japanese Laid-Open Patent Publication No. 59635/1987. This patent document does not describe a polyurethane resin having a pendant anionic hydrophilic group in the polymer chain and a carbon-carbon double bond.

Japanese Laid-Open Patent Publication No. 97890/1987 discloses a label prepared by forming a printed layer of an air-curable ink, an ultraviolet-curable ink or an electron beam-curable ink on the polyurethane-coated surface of the polyester film produced by the method described in Japanese Laid-Open Patent Publication Nos. 59635/1987 or 59636/1987.

Japanese Laid-Open Patent Publication No. 173253/1987 discloses a method of producing a polyester film for wiring boards, which comprises coating a coating composition comprising a polyurethane having an anionic group, a crosslinking agent and fine particles on a polyester film and then stretching the coated film. This patent document neither discloses polyurethane having a pendant anionic hydrophilic group in the polymer chain and a carbon-carbon double bond.

Japanese Laid-Open Patent Publication No. 263237/1987 discloses a method of producing a surface-cured polyester film, which comprises forming an actinic ray-curable acrylic resin layer on the polyurethane-coated surface of the polyester film produced by the method of Japanese Laid-Open Patent Publication Nos. 59635/1987 or 59636/987.

OBJECTS OF THE INVENTION

It is an object of this invention to provide an industrially advantageous process for producing a polyester film having a cured thin coating of polyurethane containing a carbon-carbon double bond.

Another object of this invention is to provide a process for producing a cured thin coating of polyurethane containing a carbon-carbon double bond, which comprises curing a polyurethane prepolymer having a specific composition on a polyester film in a film stretching and heat-setting step.

Still another object of this invention is to provide a method of applying the polyurethane prepolymer as an aqueous composition, in which the treatment can be performed in a clean environment, dusts and dirts do not gather on the film, and there is no risk of explosion that is likely to occur in the presence of an organic solvent.

Yet another object of this invention is to provide a process for producing a polyester film having a cured thin coating of polyurethane, in which by using a specific prepolymer having a carbon-carbon double bond, pendant anionic hydrophilic groups in the polymer chain, and isocyanate groups blocked with an oxime at the ends of the polymer chain as the polyurethane prepolymer, the prepolymer can be maintained stable in the aqueous composition, the aqueous composition can be stabilized by the hydrophilicity of the prepolymer, and the blocking agents liberated at the time of heat-curing the prepolymer on the film is not left on the cured thin coating of polyurethane.

A further object of this invention is to provide a cured thin polyurethane coating having a smooth and uniform surface by the above process.

A still further object of this invention is to provide a process which can advantageously give a film by forming a cured thin coating of polyurethane free from a substance that will become a cause of rust formation on a metal surface when it is in contact with the polyurethane coating.

A yet further object of this invention is to provide a process for producing a polyester film having a cured thin polyurethane coating having solvent resistance and antiblocking property, and easy adhesion, particularly excellent adhesion to a radical polymerized resin.

An additional object of this invention is to provide a polyester film suitable for the production of a printed film by applying an ultraviolet-curable ink to the cured thin polyurethane coating of the polyester film and then irradiating ultraviolet light onto the applied ink.

Other objects of the invention along with its advantages will become apparent from the following description.

SUMMARY OF THE INVENTION

These objects and advantages of the invention are achieved by a process for producing a biaxially oriented polyester film having a thin cured polyurethane coating, which comprises (1) applying an aqueous composition comprising a thermosetting polyurethane prepolymer as a film-forming component to at least one surface of an a film of a substantially linear saturated aromatic polyester to form a thin wet coating on it, said polyurethane prepolymer being characterized by (i) having a polyol component at least 10 % by weight of which is composed of a polyol containing a carbon-carbon double bond selected from unsaturated polyester polyols and polybutadiene polyols, the carbon-carbon double bond being cleavable under ultraviolet light, (ii) having an amount of a pendant anionic hydrophilic group in the polymer chain, to render the prepolymer water-dispersible or water soluble and (iii) having isocyanate groups blocked with an oxime at the ends of the polymer chain, said film being unstretched, monoaxially oriented or biaxially pre-stretched and (2) thereafter stretching the coated film in at least one direction to biaxially orient the stretched film and heat-setting the coated film, during which time the wet coating of the aqueous composition is dried and the polyurethane prepolymer is cured to form a thin cured polyurethane coating having a carbon-carbon double bond on the biaxially oriented polyester film.

DETAILED DESCRIPTION OF THE INVENTION

The aromatic polyester constituting the polyester film used in this invention is a substantially linear saturated polyester synthesized from an aromatic dibasic acid or its ester-forming derivative and a diol or its ester-forming derivative, and is well known to those skilled in the art. Specific examples of the polyester include polyethylene terephthalate, polyethylene isophthalate, polybutylene terephthalate, poly(1,4-cyclohexylene dimethylene terephthalate), and polyethylene-2,6-naphthalenedicarboxylate. Copolymers resulting from substituting other ester units for part of the recurring units of these aromatic polyesters, and blends of these homo- or co-polymers with a minor proportion of other resins such as polyethers, polyamides and polysulfones may also be used.

The unoriented polyester film used in this invention may be an unstretched film or a monoaxially stretched film or biaxially pre-stretched film. The unstretched film is an unoriented film obtained by melt-extruding the polymer and quenching the extrudate. The monoaxially stretched film is a film obtained by stretching the unstretched film either longitudinally or laterally. These films are not sufficiently oriented in longitudinal and lateral directions. In this sense, a film obtained by stretching an extruded and quenched unoriented film both longitudinally and laterally but at a low stretch ratio to a desired but insufficient degree of orientation can also be used as the unoriented polyester film of this invention.

In the process of this invention, an aqueous composition comprising a thermosetting polyurethane prepolymer as a film-forming component is applied to at least one surface of the unoriented polyester film in the first step.

The thermosetting polyurethane prepolymer has the properties specified in (i), (ii) and (iii) above.

Firstly, at least 10 % by weight, preferably at least 20 % by weight, more preferably at least 50 % by weight, of the polyol component is composed of a polyol having a carbon-carbon double bond.

An unsaturated polyester polyol, or a polybutadiene polyol, or both may be used as the polyol having a carbon-carbon double bond. Preferably, they have a number average molecular weight of 500 to 10,000. The unsaturated polyester polyol used in this invention has a group attributed to a compound having a carbon-carbon double bond in at least one of an acid component and a polyol component. For example, unsaturated polyester polyols derived from an unsaturated polycarboxylic acid or its acid anhydride or an unsaturated polycarboxylic acid or its acid anhydride and a saturated polycarboxylic acid as an acid component and a saturated polyhydric alcohol or an unsaturated polyhydric alcohol or a mixture thereof as a polyol component may be preferably used in this invention. Unsaturated polyester polyols derived from a saturated polycarboxylic acid as an acid component and an unsaturated polyhydric alcohol or a mixture of an unsaturated polyhydric alcohol and a saturated polyhydric alcohol as a polyol component may also be used.

Examples of preferred unsaturated polycarboxylic acids include maleic acid, fumaric acid and maleic anhydride.

Examples of the saturated polycarboxylic acid include adipic acid, sebacic acid, terephthalic acid and isophthalic acid.

Examples of the saturated polyhydric alcohol are ethylene glycol, diethylene glycol, propylene glycol, butylene glycol, neopentyl glycol, hexamethylene glycol and trimethylolpropane.

Butene diol is a preferred example of the unsaturated polyhydric alcohol.

Preferred polybutadiene polyols include, for example, 1,2-polybutadiene polyol and 1,4-polybutadiene polyol.

The unsaturated polyester polyols and polybutadiene polyols may be used singly or in combination. These polyol components may be used in combination with another component having at least two active hydrogens. Examples of the other component include saturated polyester polyols, polyether polyols (such as polyethylene glycol and polytetramethylene glycol), and amino alcohols (such as ethanolamine, diethanolamine and triethanolamine).

The other component may be used in a proportion of up to 90 % by weight, preferably up to 80 % by weight, more preferably up to 50 % by weight, based on the total weight of it and the polyol component.

The carbon-carbon double bond in the polyol component used in this invention should be cleavable under ultraviolet light.

Examples of preferred organic isocyanates which react with the polyol to form a urethane polymer chain include aromatic polyisocyanates such as diphenylmethane diisocyanate and toluene diisocyanate; aliphatic polyisocyanates such as hexamethylene diisocyanate; alicyclic polyisocyanates such as isophorone diisocyanate; aliphatic polyisocyanates such as xylylenediisocyanate; and polyisocyanates obtained by pre-reacting these isocyanates with low-molecular-weight polyols such as trimethylolpropane.

Secondly, the thermosetting polyurethane prepolymer used in this invention has a pendant anionic hydrophilic group in the polymer chain. Preferred hydrophilic groups are —SO$_3$M (where M is an alkali metal or an alkaline earth metal), —OH, and —COOR (where R is a residue of ammonia or a tertiary amine). Of these, carboxyl groups neutralized with ammonia or a tertiary amine are especially preferred.

By the introduction of the pendant anionic hydrophilic group, the polyurethane prepolymer is rendered water-dispersible or water-soluble such that it can exist stably in the aqueous composition. Consequently, coupled with the third feature described below, the aqueous composition itself can be stabilized.

The polyurethane prepolymer preferably has $3 \times 10^{-5}$ to $1 \times 10^{-3}$ equivalent, per gram of the prepolymer, of a hydrophilic group.

Thirdly, the thermosetting polyurethane prepolymer used in this invention has isocyanate groups blocked with an oxime at the ends of the polymer chain.

To give blocked isocyanate groups to the ends of the polymer chain, it is first necessary to obtain a polymer having isocyanate groups at the ends of the polymer chain. To this end, it is necessary to use the isocyanate groups in a proportion in excess of the total proportion in moles of the hydroxyl groups and active hydrogens, preferably adjust the proportion of the isocyanate groups to 1.1 to 2.0 moles per mole of the hydroxyl groups and active hydrogens combined in the production of the prepolymer, and to leave at least two unreacted isocyanate groups in the resulting prepolymer. The blocking reaction may be carried out by reacting the isocyanate-terminated prepolymer with a blocking agent (oxime) at room temperature to 100° C., as required in the presence of a urethanization catalyst.

Examples of the oxime as the blocking agent are butane oxime, methyl ethyl ketone oxime and cyclohexanone oxime.

By using the polyurethane prepolymer having the ends blocked with an oxime, the polyurethane prepolymer can be maintained stable in the aqueous composition. Then, the aqueous composition is coated on the polyester film and then heat-treated, the oxime does not remain in the cured surface coating, and the various advantages described above can be obtained.

The thermosetting polyurethane prepolymer having an unsaturated double bond can be obtained by reacting the polyol or a mixture of the polyol and a compound having at least two active hydrogens with an organic polyisocyanate. The reaction may be carried out in the absence of a solvent or in the presence of an organic solvent. The organic solvent is preferably a hydrophilic solvent which is inert to the isocyanate, and has a boiling point of not more than 100° C. or forms an azeotrope with water at a temperature of not more than 100° C. Examples include acetone, tetrahydrofuran, methyl ethyl ketone, dioxane and ethyl acetate. The above reaction is preferably carried out in the presence of an ordinary urethanization catalyst such as an organic acid, an inorganic acid, an amine compound or a metal-containing catalyst at room temperature to 100° C.

The pendant anionic hydrophilic group may be introduced in the following manner into the prepolymer obtained as above. A carboxyl group neutralized with ammonia or a tertiary amine may be introduced into the polyurethane prepolymer by, for example, using a carboxyl-containing polyhydroxy compound as one reaction material in the production of the polyurethane prepolymer, or by reacting a hydroxyl-containing carboxylic acid with part of the unreacted isocyanate groups of the polyurethane prepolymer, and then adding the reaction product in aqueous ammonia or an aqueous solution of a tertiary amine with stirring at high speeds to neutralize the introduced carboxyl group. The amount of the carboxyl group or its salt to be introduced is preferably 0.1 to 15 % by weight. Examples of the hydroxyl-containing carboxylic acid are dimethylolpropionic acid, dimethylolbutyric acid, dimethylolvaleric acid, bis(ethylene glycol)trimellitate, 3-hydroxypropionic acid, gamma-hydroxybutyric acid, p-(2-hydroxyethyl)benzoic acid, or malic acid. Examples of the base for neutralizing the carboxylic acid are ammonia, and tertiary amines such as trimethylamine, triethylamine, triisopropylamine, tributylamine, triethanolamine, methyldiethanolamine, dimethylethanolamine and diethylethanolamine.

One example of producing the thermosetting polyurethane prepolymer used in this invention is shown below. Hexamethylene diisocyanate (16.8 parts by weight) is added to a mixture of 70 parts by weight of polybutadiene polyol (molecular weight 2000) and 30 parts by weight of polyethylene glycol (molecular weight 2000). The mixture was reacted while maintaining a temperature of not more than 100° C. to obtain a polyurethane prepolymer having free isocyanate groups. Then, 50 parts by weight of methyl ethyl ketone is added as a reaction solvent to the prepolymer, and further 3.3 parts by weight of dimethylolpropionic acid (introduction of —COOH group) is added and reacted with about half of the free isocyanate groups to give a polyurethane prepolymer. Furthermore, 4.4 parts by weight of butanone oxime was added to the prepolymer to block the free isocyanate groups completely, and then 2.5 parts by weight of triethylamine is added to neutralize the carboxyl groups. The reaction product is diluted with water as required to give an aqueous composition used in step (1) of the process of this invention (may sometimes be referred to as an aqueous primer coating solution).

The aqueous composition used in this invention may be in the form of a solution, an emulsion, or a dispersion.

As required, a surface-active agent such as an anionic or nonionic surface-active agent may be included in the aqueous composition.

The surface-active agent is preferably one which can decrease the surface tension of the aqueous coating composition to 40 dynes/cm or below, and promotes wetting of the polyester film. Examples include polyoxyethylene alkylphenyl ethers, polyoxyethylene fatty acid esters, sorbitan fatty acid esters, glycerin fatty acid esters, aliphatic metal soaps, alkylsulfate salts, alkylsulfonate salts and alkylsulfosuccinate salts. Other additives, such as antistatic agents, ultraviolet absorbers, pigments, organic fillers, inorganic fillers, lubricants and antiblocking agents may be incorporated in amounts which do not reduce the effects of the present invention.

In step (1), the aqueous composition is applied to one or both surfaces of an unoriented polyester film, preferably a monoaxially stretched film. Preferably, the aqueous composition contains up to 30 % by weight, especially up to 1 to 10 % by weight, of solids.

The wet coating of the aqueous composition formed on the unoriented film preferably has a thickness corresponding to a weight of 0.5 to 20 g per m$^2$, preferably 1 to 10 g per m$^2$. Preferably, the aqueous composition is coated during the process of producing the polyester film.

The coating may be effected by any known coating method, for example, roll coating, gravure coating, roll brush coating, spray coating, air knife coating, impregnation and curtain coating either singly or in combination.

In step (2), the unoriented polyester film having the thin wet coating obtained in step (1) is then stretched and heat-set. By step (2), the wet coating of the aqueous composition is dried and the polyurethane prepolymer is cured to form a thin cured polyurethane coating having a carbon-carbon double bond on the biaxially oriented polyester film.

The thermosetting polyurethane prepolymer is characterized by the properties (i), (ii) and (iii), and brings about the advantage of giving a smooth and uniform thin cured polyurethane coating even when undergoing heat-treatment at a relatively high temperature for a short period of time. As a result, step (2) of the invention can be incorporated in the stretching and heat-setting step of polyester film production which is carried out at a relatively high temperature and increases the industrial significance of the process of this invention.

In step (2) of the process of this invention, heat-setting is carried out preferably at 150 to 240° C. The heat-set time is preferably about 3 to 60 seconds. Specifically in step (2), while, for example, a longitudinally stretched polyester film on which the aqueous composition has been coated is introduced into a stenter and stretched laterally and heat-set, the applied wet coating is dried to form a thin cured coating of polyurethane on the film. The stretch ratio is preferably at least three times in one direction (at least 9 times, preferably 10 times, as the product of the stretch ratios in two directions). The resulting polyester film is crystallized and oriented to such an extent that its heat of crystal fusion is usually at least 4 cal/g when measured by a differential scanning calorimeter in a nitrogen atmosphere at a temperature elevating rate of 10° C./min. Preferably, the drying is carried out before or during stretching in step (2).

The aromatic polyester film of this invention having the resulting thin cured polyurethane coating containing a carbon-carbon double bond shows high adhesion to a very broad range of paints including on at least one surface of it an ink for cellophane, a UV ink, a UV paint, a magnetic paint, a gelatin composition, an electrophotographic toner composition, a chemical mat paint, and is particularly useful with respect to radical-polymerizable paints and inks which cure under ultraviolet light or electron beams.

In particular, the aromatic polyester film of this invention is advantageously used for the production of a printed film by applying an ultraviolet-curable ink to its surface, and irradiating ultraviolet light onto the ink.

Accordingly, the present invention also provides a printed film obtained by applying an ultraviolet-curable ink to the thin cured polyurethane coating on the aromatic polyester film.

An ultraviolet-curable ink (UV ink) is known, and comprises, for example, 15 to 20 % by weight of a pigment, 20 to 30 % by weight of the prepolymer and 30 to 40 % by weight of a monomer as film-forming components (main components), 1 to 5 % by weight of a photopolymerization initiator and not more than 0.1 % by weight of a polymerization initiator, and other adjuvants.

Examples of the film-forming components as main components include prepolymers of acrylic esters such as ethylene glycol diacrylate, propylene glycol diacrylate, neopentyl glycol diacrylate, 1,6-hexanediol diacrylate, diethylene glycol diacrylate, triethylene glycol diacrylate, dipropyleneglycol diacrylate, dipentaerythritol pentaacrylate, dipentaerythritol hexaacrylate, diethylaminoethyl acrylate, methyl acrylate, ethyl acrylate, n-butyl acrylate, isobutyl acrylate, 2-ethylhexyl acrylate, isodecyl acrylate, lauryl acrylate, stearyl acrylate, 2-hydroxyethyl acrylate, 2-hydroxypropyl acrylate, trimethylol propane triacrylate, methoxyethyl acrylate, n-butoxyethyl acrylate, tetrahydrofurfuryl acrylate, glycidyl acrylate, ethylcarbitol acrylate, methyltriglycol acrylate, benzyl acrylate, 1,5-pentanediol diacrylate, pentaerythritol triacrylate and 2hydroxyethylacryloyl phosphate, and of the corresponding methacrylates, and prepolymers of various (meth)acrylates such as polyester (meth)acrylate, urethane (meth)acrylate and epoxy (meth)acrylate.

The following Examples illustrate the present invention.

All parts in the following examples are by weight. The properties of the film are measured by the following methods.

1. Adhesion

An ultraviolet-curable ink (UVS-PCD-Crimson T, made by Moroboshi Ink Co., Ltd.) was printed in a thickness of 4 microns on a primer-treated polyester film obtained by coating a composition comprising a polyurethane prepolymer as a main component on a polyester film and heat-treating the coating to cure it. Ultraviolet light was irradiated onto the printed film at a dose rate of 80 (W/cm) and a speed of 3 (m/min.) by using a UV irradiation device (Model ASE-20, supplied by Nihon Denchi Co., Ltd.) to cure the printed layer.

Then, a Scotch tape No. 600 (19.4 mm wide) was applied to the printed layer while avoiding entry of air bubbles. The surface of the tape was rolled with a manual load roll JIS-C2701 (1975)) to permit intimate adhesion. The film was cut to the width of the tape to prepare a sample. The non-tacky ends portions of the sample were held by two hands, and the tape was rapidly peeled off. The state of peeling of the ultraviolet-cured ink layer was then observed and rated as follows.

| Ratio of the ultraviolet-cured ink remaining on the polyester film (area %) | Rating |
| --- | --- |
| 100 | 5 |
| 70–99 | 4 |
| 40–70 | 3 |
| 20–40 | 2 |
| 0–20 | 1 |

2. Solvent resistance

Five drops (about 0.1 cc) of tetrahydrofuran were dropped by a squirt onto the surface of the primer-treated polyester film and gauze was placed on it. A weight of 200 g was further placed on the gauze and the gauze was moved at a rate of about 1000 mm/min. The film was dried at room temperature. Photographs of the sample and a comparative sample not treated with tetrahydrofuran were taken through an interference microscope (400X), and compared. The state of change of the surface of the primer was rated as follows:

○: The primer scarcely changed.
○-Δ: The surface form slightly changed in the middle part of the primer.
Δ: The change of the surface form was intermediate.
X-Δ: The surface form changed considerably.
X : Most of the primer was removed.

3. Blocking property (tackiness)

Primer-treated polyester films were superimposed with their coated surfaces in contact with each other, and left to stand for 24 hours in an atmosphere kept at 50° C. while a load of 50 kg/cm$^2$ was exerted on them. Then, the peel strength was measured. The results were rated as follows:

| Rating | Peel strength (g/10 cm width) |
| --- | --- |
| O | less than 10 |
| X | at least 10 |

EXAMPLES 1–4 and COMPARATIVE EXAMPLES 1–2

Polyethylene terephthalate (containing a lubricant) having an inherent viscosity, measured in o-chlorophenol at 25° C., of 0.65 was melt-extruded onto a rotating quenching drum maintained at 20° C. to form an unstretched film having a thickness of 950 micrometers. The film was then stretched to 3.5 times in the machine direction. An aqueous coating composition containing a polyurethane prepolymer having each of the compositions indicated in Table 1 was coated on both surfaces of the monoaxially stretched film by a kiss coating method at an average coating rate of 100 mg/m$^2$ as solids. The coated film was subsequently stretched in the lateral direction to 3.9 times at 105° C., and then heat-set at 220° C. to obtain a 75 micrometer thick polyester film coated with the primer on both surfaces.

The properties of the film are shown in Table 2.

TABLE 1

| Composition of the polyurethane prepolymer (parts) | Ex. 1 | Ex. 2 | Ex. 3 | Ex. 4 | CEx. 1 | CEx. 2 |
| --- | --- | --- | --- | --- | --- | --- |
| Polyol | | | | | | |
| Polybutadiene polyol (M = 2000) | 70 | — | 60* | — | — | — |
| Unsaturated polyester polyol [maleic anhydride/1,6-hexanediol (M = 1000)] | — | 70 | — | 60** | — | 70 |
| Polyethylene glycol (M = 1000) | — | 30 | — | 40 | 100 | 30 |
| Polyethylene glycol (M = 2000) | 30 | — | 40 | — | — | — |
| Trimethylolpropane | — | — | — | — | 3 | — |
| Polyisocyanate | | | | | | |
| Hexamethylene diisocyanate | 16.8 | — | — | — | 40 | — |
| 2,4-Toluene dissocyanate | — | 33.1 | 33.1 | 33.1 | — | 17.2 |
| Blocking agent | | | | | | |
| Butanone oxime | 4.4 | — | — | — | 14.9 | — |
| Methyl ethylketone oxime | — | 7.9 | 7.9 | 7.9 | — | — |
| Hydrophilicity imparting agent | | | | | | |
| Dimethylolpropionic acid | 3.3 | 3.0 | 3.0 | 3.0 | 3.0 | 3.0 |
| Neutralizing agent | | | | | | |

TABLE 1-continued

| Composition of the polyurethane prepolymer (parts) | Ex. 1 | Ex. 2 | Ex. 3 | Ex. 4 | CEx. 1 | CEx. 2 |
|---|---|---|---|---|---|---|
| Triethylamine | 2.5 | 2.2 | 2.2 | 2.2 | 6.5 | 2.2 |

*The molecular weight (M) of the polybutadiene polyol was 3,000.
**The molecular weight (M) of the unsaturated polyester polyol was 2,000.

TABLE 3

| Properties | Ex. 1 | Ex. 2 | Ex. 3 | Ex. 4 | CEx. 1 | CEx. 2 |
|---|---|---|---|---|---|---|
| UV ink adhesion | 5 | 5 | 5 | 5 | 3 | 3 |
| Solvent resistance | O | O | O | O | O | X |
| Blocking property | O | O | O | O | O | X |

We claim:

1. A process for producing a biaxially oriented polyester film having a thin cured polyurethane coating, which comprises
   (1) applying an aqueous composition comprising a thermosetting polyurethane prepolymer as a film-forming component to at least one surface of a film of a substantially linear saturated aromatic polyester to form a thin wet coating on it, said polyurethane prepolymer being characterized by (i) having a polyol component at least 10% by weight of which is composed of a polyol containing a carbon-carbon double bond selected from the group consisting of unsaturated polyester polyols and polybutadiene polyols, the carbon-carbon double bond being cleavable under ultraviolet light, (ii) having a pendant anionic hydrophilic group in the prepolymer chain an amount of to render the prepolymer water-dispersible or water soluble, and (iii) having isocyanate groups blocked with an oxime at the ends of the polymer chain, said film being unstretched, monoaxially oriented or biaxally pre-stretched and
   (2) thereafter stretching the coated film in at least one direction to biaxially orient the stretched film and heat-setting the coated film, during which time the wet coating of the aqueous composition is dried and the polyurethane prepolymer is cured to form a thin cured polyurethane coating have a carbon-carbon double bond on the biaxially oriented polyester film.

2. The process of claim 1 in which the aqueous composition has a solids concentration of up to 30% by weight.

3. The process of claim 1 in which the wet coating has a thickness corresponding to a weight of 0.5 to 20 g per m² of the film.

4. The process of claim 1 in which the heat-setting is carried out at a temperature of 150° to 240° C.

5. The process of claim 4 wherein in step (2) the coated film is stretched to provide a degree of crystallization and orientation such that its heat of crystal fusion is at least about 4 cal/g when measured by a differential scanning calorimeter in a nitrogen atmosphere at a temperature elevating rate of 10° C./min.

6. The process of claim 1 in which the unoriented aromatic polyester film is a monoaxially stretched aromatic polyester.

7. The process of claim 1 in which the polyurethane prepolymer has $3\times10^{-5}$ to $1\times10^{-3}$ equivalent, per gram of the prepolymer, of a hydrophilic group.

8. The process of claim 1 wherein the substantially linear saturated aromatic polyester is selected from the group consisting of polyethylene terephthalate, polyethylene isophthalate, polybutylene terephthalate, poly(1,4-cyclohexyle dimethylene terephthalate), and polyethylene-2,6-naphthalenedicarboxylate.

9. The process of claim 1 wherein the polyurethane prepolymer is characterized by (i) at least 20% by weight of the polyol component composed of a polyol having a carbon-carbon double bond.

10. The process of claim 9 wherein at least 50% by weight of the polyol component is composed of a polyol containing a carbon-carbon double bond.

11. The process of claim 10 wherein the polyol comprises an unsaturated polyester polyol.

12. The process of claim 10 wherein the polyol comprises a polybutadiene polyol.

13. The process of claim 1 wherein the polyurethane prepolymer is characterized by (ii) pendant anionic hydrophilic groups selected from the group consisting of —$SO_3M$ (where M is a alkali metal or an alkaline earth metal), —OH, and —COOR (where R is a residue of ammonia or a tertiary amine).

14. The process of claim 13 wherein the anionic hydrophilic groups comprise carboxyl groups neutralized with ammonia or a tertiary amine.

15. The process of claim 1 wherein the polyurethane prepolymer is characterized by (iii) having isocyanate groups blocked with an oxime selected from the group consisting of butane oxime, methyl ethyl ketone oxime and cyclohexyl oxime at the ends of the polymer chain.

16. The process of claim 1 in which the aqueous composition has a solid concentration of from 1 to 10% by weight.

17. The process of claim 1 in which the wet coating has a thickness corresponding to a weight of from 1 to 10 g per m² of the film.

* * * * *